United States Patent [19]
Sethi et al.

[11] Patent Number: 5,944,995
[45] Date of Patent: Aug. 31, 1999

[54] CLARIFIER FEEDWELL

[75] Inventors: Bal K. Sethi; Sherman C. Wu, both of Mississauga, Canada; John P. Crane, Salt Lake City, Utah

[73] Assignee: Baker Hughes Incorporated, Houston, Tex.

[21] Appl. No.: 09/013,647

[22] Filed: Jan. 26, 1998

[51] Int. Cl.⁶ .................................................. B01D 21/24
[52] U.S. Cl. ...................... 210/519; 210/528; 210/532.1; 210/538
[58] Field of Search ................... 210/519, 521, 210/528, 532.1, 538, 540, 801

[56] References Cited

U.S. PATENT DOCUMENTS

| | | | |
|---|---|---|---|
| 973,357 | 10/1910 | Lewis et al. | 210/519 |
| 2,098,467 | 11/1937 | Sayers et al. | 210/519 |
| 3,006,474 | 10/1961 | Fitch | 210/801 |
| 3,397,788 | 8/1968 | Duff et al. | 210/519 |
| 3,485,365 | 12/1969 | Keller | 210/519 |
| 4,054,514 | 10/1977 | Oltmann . | |
| 4,278,541 | 7/1981 | Eis et al. . | |
| 4,462,909 | 7/1984 | Kennel . | |
| 5,244,573 | 9/1993 | Horisawa | 210/519 |
| 5,422,017 | 6/1995 | Felder et al. | 210/521 |
| 5,453,197 | 9/1995 | Strefling | 210/519 |
| 5,505,860 | 4/1996 | Sager | 210/519 |

FOREIGN PATENT DOCUMENTS

| | | |
|---|---|---|
| 68790 | 3/1949 | Denmark . |
| 0 010 395 B1 | 4/1980 | European Pat. Off. . |
| 1066997 | 10/1959 | Germany . |
| 2558872 | 7/1977 | Germany . |
| 1437073 | 11/1988 | U.S.S.R. . |

*Primary Examiner*—Christopher Upton
*Attorney, Agent, or Firm*—Trask, Britt & Rossa

[57] ABSTRACT

A feedwell for use in a clarifier tank is disclosed which provides improved energy dissipation and reduction of fluid velocity in an influent feed stream to reduce turbulence in the clarifier tank as the influent feed enters the clarifier tank for separation. The feedwell generally comprises a walled member having a substantially continuous wall which is structured to provide an area of increasing cross sectional area so that liquid circulating through the feedwell is reduced in velocity as it moves through the feedwell and into the clarifier tank. The feedwell may include additional elements which enhance dissipation of energy, including an angled rim positioned at the lower edge of the walled member to provide a contact surface against which fluid may flow to dissipate energy, and at least one baffle. The feedwell of the present invention improves the settling rate of clarifier tanks and simplifies operation while reducing operating costs.

12 Claims, 5 Drawing Sheets

CLARIFIER FEEDWELL

BACKGROUND OF THE INVENTION

1. Field of the Invention:

This invention relates to clarifier tanks used to separate liquid and solids components of an influent feed slurry, and specifically relates to feedwell apparatus employed in such clarifiers to enhance the clarification process.

2. Description of Related Art:

Clarifier tanks are used in a wide variety of industries to separate an influent feed slurry comprising a solids- or particulate-containing fluid to produce a "clarified" liquid phase having a lower concentration of solids than the influent feed slurry and an underflow stream having a higher concentration of solids than the influent feed slurry. Clarifier tanks conventionally comprise a tank having a floor and a continuous wall which define a volume within which the clarification process takes place. Clarifier tanks also include an influent feed pipe for delivering influent feed to the tank, an underflow outlet for removing settled solids from the tank and a fluid discharge outlet for directing clarified liquid away from the tank. Clarifier tanks may also include a rake assembly having rake arms for sweeping along the floor of the tank, and may include an overflow launder or bustle pipe for collecting clarified liquid near the top of the tank.

Clarifier tanks of the type described operate by introducing an influent feed stream into the volume of the tank where the influent is retained for a period long enough to permit the solids to settle out by gravity from the fluid. The solids which settle to the bottom of the tank produce a sludge bed near the bottom of the tank which is removed through the underflow outlet. Clarified liquid is formed at or near the top of the clarifier tank and is directed away from the tank for further processing or disposal. Settling of solids may be enhanced in some applications by the addition of a flocculent or polymer which forms agglomerates that settle more readily. In many applications, an objective of fluid clarification is to enhance the settling process to achieve a high throughput of solids, and thereby enhance solids recovery.

Many clarifier tanks are constructed with a feedwell, usually centrally located within the tank, into which the influent feed stream is delivered. The feedwell generally serves the purpose of reducing the fluid velocity of the incoming influent feed stream so that the energy in the stream may be dissipated to some degree before entering the tank. Dissipation of energy in the influent feed stream lessens the disruptive effect that the incoming influent feed has on the settling rate of the solids in the tank. In other words, introduction into a clarifier of an influent feed stream under high fluid velocity tends to cause turbulence in the tank and compromises the settling rate of solids. A feedwell may be structured in a variety of ways, therefore, to create or enhance dissipation of energy in the influent feed. For example, the feedwell and influent feed pipe may be structured to introduce influent feed to the feedwell at two opposing directions and into an annular space, such as is disclosed in U.S. Pat. No. 4,278,541 to Eis, et al.

While the several types of feedwells known in the art are useful for reducing fluid velocity in the influent feed stream, they have varying degrees of efficacy. Thus, it would be advantageous to provide a feedwell structured to further reduce fluid velocity and thereby enhance solids separation and fluid clarification.

BRIEF SUMMARY OF THE INVENTION

In accordance with the present invention, a feedwell for use in a clarifier tank is structured with an increasing cross sectional area into which influent feed can flow, thereby promoting the dissipation of energy in the influent feed stream and reducing fluid velocity prior to movement of the influent feed stream into the clarifier tank. The feedwell of the present invention may also be structured with an angled rim to direct the influent feed stream inwardly and downwardly within the tank to further avoid disrupting the settling of solids, and may include at least one vertical baffle against which incoming influent feed is contacted to dissipate the energy in the influent feed slurry. The feedwell disclosed herein may be employed in any type of clarifier tank for any number of industrial applications, but is described herein with respect to use of clarifiers in processing green liquor in the pulping industry, by way of example.

The feedwell of the present invention comprises a walled member which is configured with an increasing lateral, or horizontal, cross section from the point of introduction of an influent feed slurry into the feedwell to the point of discharge of the influent feed slurry into the clarifier tank. Thus, as influent feed slurry is introduced into the feedwell and circulates downwardly toward the point of entry into the tank, the slurry encounters an ever-increasing area in which the fluid may move and circulate to gradually dissipate energy and reduce the velocity of the fluid. Introduction into the feedwell of a slurry, to which has been added a flocculent or suitable polymer, creates a condition that enhances the flocculation of the solids and improves the settling rate of the solids.

The walled member of the feedwell may, in a particularly suitable embodiment, be conically-shaped, thereby providing an outward and downward sloping wall which provides an increasing lateral cross section in the feedwell. Other equally suitable configurations may be employed. In its simplest form, the feedwell may be configured to receive an influent feed stream at or near the top of the walled member, with introduction of the slurry into the tank occurring through the bottom opening of the feedwell. In an alternative embodiment, the feedwell may comprise an upper, substantially circular portion into which an influent feed stream is introduced and a lower portion, or walled member, of increasing cross sectional area. In either embodiment, the walled member may include a rim portion positioned below the walled member at the opening of the feedwell into the tank. The rim portion provides an inwardly and downwardly sloped surface for directing the influent feed into the center of the clarifier tank. The feedwell may also include at least one baffle positioned to contact the incoming influent feed stream as it circulates through the feedwell to further dissipate energy in the slurry and reduce the fluid velocity.

The feedwell may preferably be structured to receive influent feed at a tangential angle to the walled member or upper portion to initiate dissipation of energy in the influent feed. In a particularly preferred embodiment, influent feed is directed into the feedwell at a tangential angle from two opposing points along the walled member or the upper portion so that the two streams of influent contact each other. As the fluid moves downwardly into the walled member, it encounters an ever-increasing cross sectional area which enhances the dissipation of energy in the fluid. The fluid may also encounter one or more baffles positioned within the walled member to further reduce the velocity of the fluid and to hinder the formation of any vortex caused by the rotating influent feed. The downwardly moving fluid may finally encounter a downwardly angled and inwardly oriented rim of the feedwell which directs the fluid toward the center of the tank to lessen the impact of the moving fluid on the sludge bed and separating fluid.

In a recausticizing process in the pulp and paper industry, the liquor which results from the chemical degradation of wood chips, known as black liquor, is processed in a recovery boiler to produce a residue known as smelt. The smelt is then dissolved in liquid to produce green liquor. The green liquor contains suspended solids from the smelt which must be separated in a clarifier tank. The clarified green liquor is further processed by causticizing to produce white liquor, which is then used to initiate the pulping process. In the context of employing a feedwell of the present invention in a recausticizing process, the present invention provides significant advantages over conventional clarifier systems now in use.

Specifically, the increasing area of the walled member of the feedwell dissipates energy in the incoming influent feed stream to a degree which is not achievable with conventional feedwells having a static area. Additionally, an angled rim at the large diameter outlet of the feedwell, and the use of baffles, help reduce fluid velocity and reduce the formation of a vortex in the influent feed stream so that a more quiescent flow of the influent feed into the clarifier tank is achieved. The improved energy dissipation achieved with the feedwell of the present invention enhances the settling rate of the dregs (i.e., the suspended solids in liquor) in the clarifier tank as a principal advantage. However, the improved settling rate also reduces the need for the addition of excessive flocculents, which thereby reduces operating costs. A quantifiable reduction in non-process elements, or metal elements such as iron, manganese, phosphorus and aluminum, is observed in the clarification of green liquor in the recausticizing process.

The feedwell of the present invention also provides advantages over the use of filter clarifiers which are often used in green liquor clarification. That is, a filter clarifier generally includes a cylindrical tank having a conical bottom, an influent feed pipe, an outlet formed at the bottom of the tank and a filtration bed of filter media. While filtration tanks of the type described require less space for operation, they may be more costly to operate since the filter bed becomes fouled with solids accumulation and must be cleaned from time to time. The down-time for cleaning the filter bed results in intermittent disruption of the clarifier's operation. Thus, the present invention provides increased settling rates while providing more simplified operation, reduced maintenance time and costs and continuous operation. The feedwell of the present invention can also be used in the clarification of white liquor in the recausticizing process to remove lime mud in the clarification of the white liquor.

The advantages described with respect to a recausticizing process may be observed in applications other than the pulp and paper industry. The described advantages, and more, will be evident from the following detailed description of the invention.

BRIEF DESCRIPTION OF THE SEVERAL DRAWINGS

In the drawings, which illustrate what is currently considered to be the best mode of carrying out the invention:

DETAILED DESCRIPTION OF THE DRAWINGS

Figure 1:
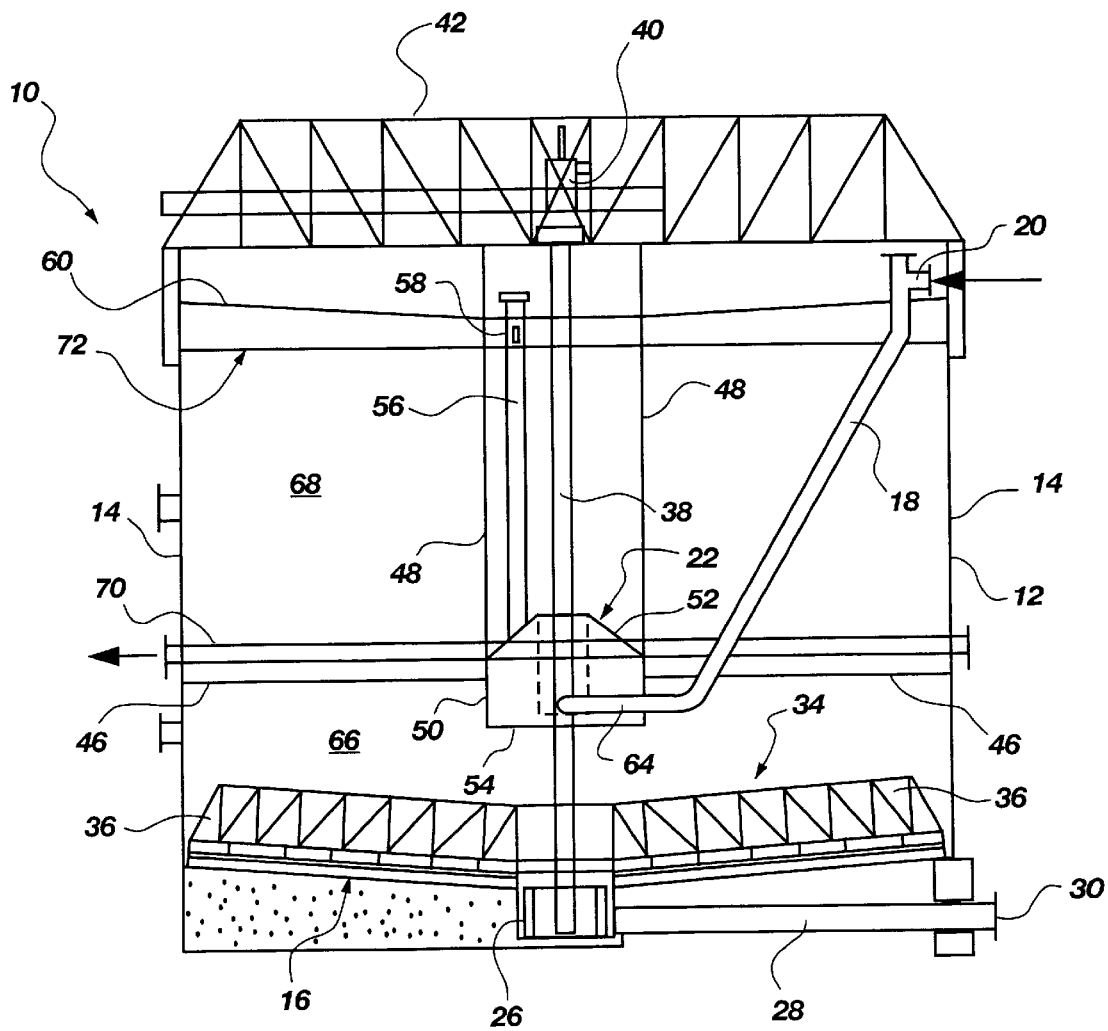
FIG. 1 is a schematic view, in cross section, of a conventional unit storage clarifier tank employing a conventional feedwell.

FIG. 1 illustrates, by way of example, a conventional unit storage clarifier tank 10 of the type commonly used in the clarification of green liquor in a recausticizing process. Notably, a unit storage clarifier tank differs from a standard clarification tank by having storage capacity for clarified liquid, as described more fully below. The unit storage clarifier tank 10 includes a tank 12 having a continuous wall 14 and a bottom 16 defining a volume within which a liquid containing a solids component is separated into clarified liquid and liquid/solid phases. An influent feed pipe 18 having an inlet 20 is positioned for directing an influent feed stream into the tank 12. More specifically, as shown in FIG. 1, the influent feed pipe 18 may be positioned to deliver the influent feed stream into a feedwell 22 to reduce the velocity of the influent feed stream prior to its introduction into the tank 12. The bottom 16 of the clarifier tank 10 may be inwardly and downwardly sloped, as illustrated, to facilitate movement of the dregs, or the liquid/solids phase of the separated influent, into a central opening 26 in the tank. Alternatively, the tank bottom may be flat. The dregs, also referred to herein as "sludge," are then removed from the tank 12 through an underflow pipe 28 and outlet 30. The movement of sludge in the tank 12 is also facilitated by a rake assembly 34, which generally comprises one or more rake arms 36 which rotate about the central axis of the tank 12. The rake arms 36 are attached to a drive shaft 38 which is connected to a drive motor 40, usually positioned on a bridge 42 which spans the tank 12.

The conventional feedwell 22 shown in FIG. 1 is centrally located within the tank 12, and is maintained in place within the tank 12 by stabilizer rods or cables 46 which connect the feedwell 22 to the wall 14 of the tank 12 and by rods or cables 48 which suspend the feedwell 22 from the bridge 42. The feedwell 22 surrounds the drive shaft 38 which operates the rake assembly 34. A conventional feedwell 22 which is configured for use in a unit storage clarifier tank 10 is structured with a perimeter wall 50, a substantially closed top 52 and an open bottom 54. The feedwell 22 may include a vent line 56 which allows entrained air to escape from the feedwell 22. The vent line 56 is preferably constructed with a vent opening 58 below the roof 60 of the tank 12 so that the air is vented into the tank 12 rather than to atmosphere because the vent line 56 may, in some conditions, act as an air lift.

It should be noted that feedwells used in unit storage clarifier tanks are submerged below the fluid line of the tank and have a substantially enclosed top which prevents influent feed from mixing with the clarified liquid formed in the tank. By contrast, a feedwell employed in a standard clarifier tank is positioned near the top of the tank such that the top of the feedwell is positioned at or above the fluid line of the tank. Feedwells of conventional construction used in standard clarifier tanks, therefore, do not typically include an enclosed top or a vent line and usually comprise a simple, vertically-walled unit having an open top.

In many conventional green liquor clarifier tanks 10, the influent feed pipe 18 is connected to one or more nozzles 64 which deliver the influent feed into the feedwell 22 at a tangential angle to the wall 50 of the feedwell 22. Some conventional feedwells 22 are structured with two such nozzles 64 which deliver the influent feed at opposing angles, and at different elevations, to the feedwell 22. The velocity of the influent feed is reduced by some degree before the liquid moves through the open bottom 54 of the feedwell 22 into the tank 12. As the liquid in the tank 12 becomes more quiescent, the solids component of the influent feed settles to the bottom 16 of the tank to form the dregs of the green liquor. Separation takes place in a clarification zone 66 of the tank 12 which is generally located in the bottom one third of the area of the tank 12. Clarified liquid is formed near the upper area of the tank 12 in both a standard clarifier tank and a unit storage clarifier tank 12 of the type shown in FIG. 1. A unit storage clarifier tank 10 has a clarified liquid storage zone 68, however, while a standard clarifier tank does not. Clarified liquid is removed from the tank 12 of a unit storage clarifier 10 through an effluent pipe 70 which may be located at any appropriate level of the clarified liquid storage zone 68. As illustrated in FIG. 1, the effluent pipe 70 may be located at a vertical midpoint of a unit storage clarifier tank 12. In a standard clarifier tank, the effluent pipe 70 is usually located nearer to the level 72 of the liquid in the tank 12 and the effluent pipe 70 may be in the form of an overflow launder.

While conventional feedwells 22 of the type illustrated in FIG. 1 are functional in reducing flow velocity in the influent feed stream, they leave room for improvement. Thus, the present invention, illustrated in FIGS. 2–5, provides structural elements which improve the reduction of flow velocity in the influent feed to thereby improve settling rates in the tank 12.

Figure 2:
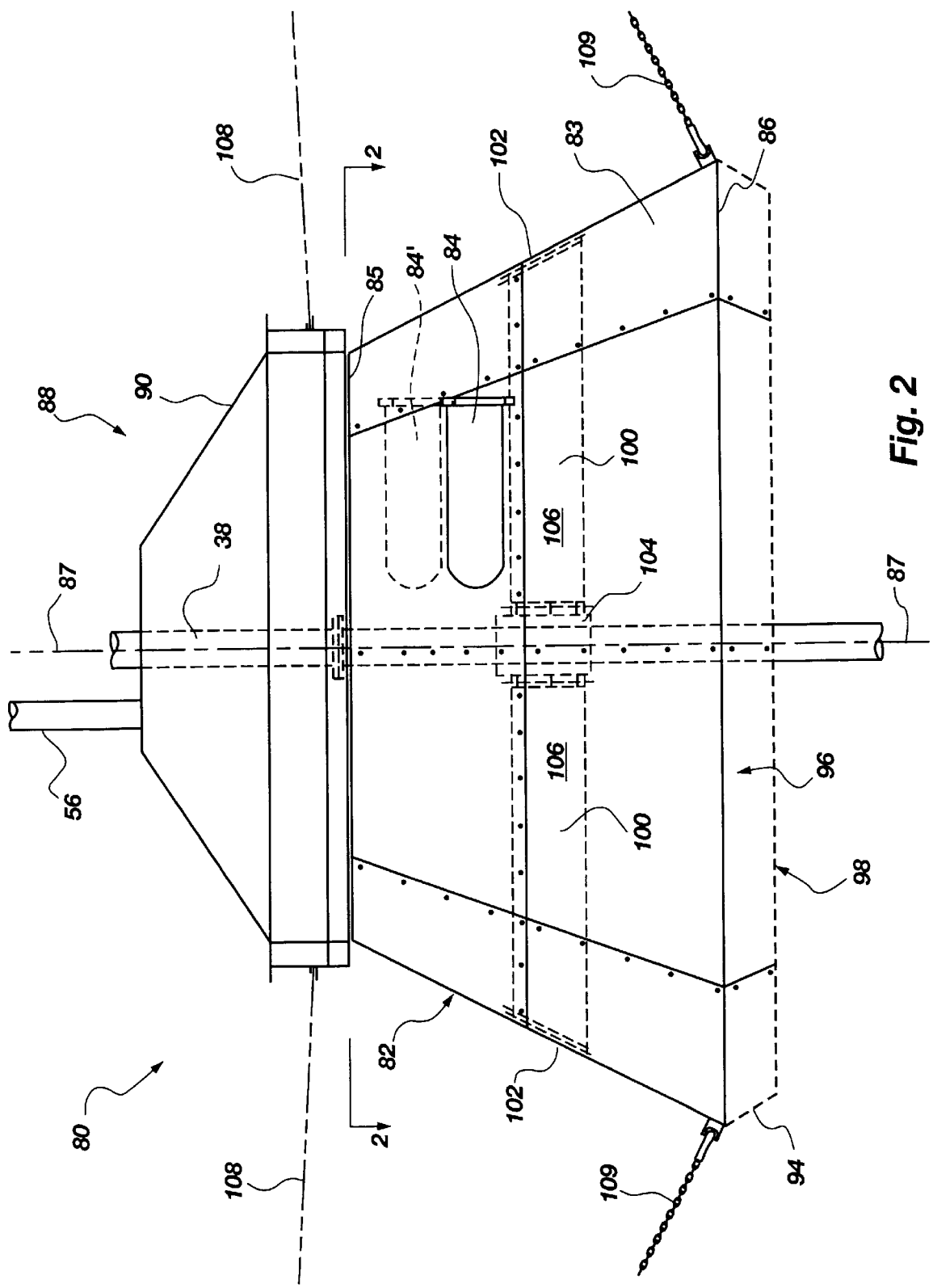
FIG. 2 is a view in elevation of a first embodiment of the feedwell of the present invention.
Figure 3:
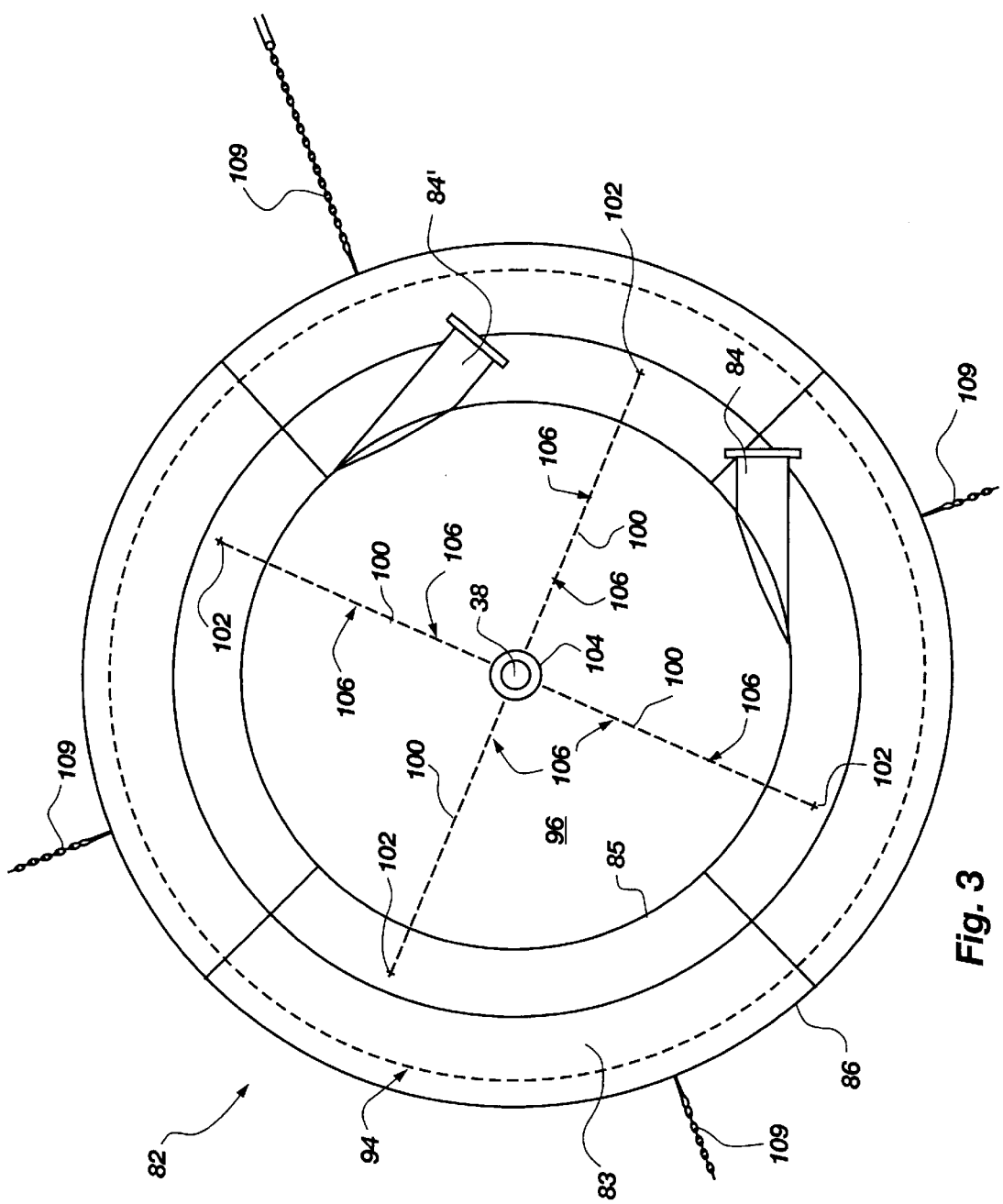
FIG. 3 is a view in lateral cross section of the feedwell shown in FIG. 2 taken at line 2—2.

FIG. 2 illustrates an exemplar feedwell 80 of the present invention which may be constructed as an element of a new clarifier tank or may be adapted as a retrofitted element of an existing clarifier tank. Further, the feedwell 80 may be adapted for use in either a standard clarifier tank, in which case the feedwell 80 is positioned near the top of the tank, or in a unit storage clarifier tank, in which case the feedwell is submerged and includes an enclosed top, as described more fully below. The feedwell 80, in its simplest form, comprises a three-dimensional walled member 82 which is configured to provide an increasing area for flow and circulation of influent slurry entering into the feedwell 80. The three-dimensional walled member 82 comprises a substantially continuous wall 83 which forms an enclosure into which the influent slurry is introduced. The continuous wall 83 extends from an upper perimeter edge 85 to a lower perimeter edge 86 of the walled member 82, the upper perimeter edge 85 being of lesser dimension than the lower perimeter edge 86 such that the substantially continuous wall 83 slopes in an outward and downward angle to the central axis 87 of the feedwell 80. Thus, the area of lateral cross section (i.e., normal to the central axis 87) of the walled member 82 near the upper perimeter edge 85 is less than the area of cross section of the walled member 82 near the lower perimeter edge 86. The walled member 82 may be configured as a truncated conical shape, as shown in FIGS. 2 and 3, or may be configured as a truncated trapezoidal shape, a multifaceted conical shape generally having a multi-planar horizontal cross section (e.g., pentagonal, hexagonal, octagonal, etc.), or may be elliptical in horizontal cross section, or any other appropriate and suitable shape.

Influent slurry enters into the walled member 82 through nozzles 84 and 84' which extend through the substantially continuous wall 83 of walled member 82 near the upper perimeter edge 85 of the feedwell 80. As shown more clearly in FIG. 3, the nozzles 84, 84' may be positioned in opposing orientation to each other along the wall 83 of the walled member 82 to deliver the influent slurry at a tangential angle to the wall 83, and the nozzles 84, 84' may be positioned at different elevations to each other, as shown in FIG. 2. Delivery of the influent slurry at an angle to the wall 83 helps initiate dissipation of energy in the liquid. Notably, although two nozzles 84, 84' are illustrated, a single nozzle may be suitable. Influent slurry entering into the feedwell 80 near the upper perimeter edge 85 circulates within the walled member 82 of the feedwell 80 and encounters an ever-increasing area into which the liquid may flow. As a result, more energy is dissipated from the liquid, thereby reducing the fluid velocity of the influent slurry.

The walled member 82 may preferably be structured for installment about the drive shaft 38 of a rake assembly in a clarifier tank. Thus, in an embodiment where the feedwell 80 is to be employed in a unit storage clarifier tank 10 of the type shown in FIG. 1, the walled member 82 is enclosed by a top 88 which prevents mixture of influent slurry with clarified liquid stored in the storage zone 68 of the unit storage clarifier tank 10. The top 88 may preferably be a conically-shaped cover 90 which is structured to accommodate the passage of the drive shaft 38 therethrough. Alternatively, the enclosed top 88 may be any threedimensional shape which facilitates the movement of solids off of, and away from, the feedwell 80 so that the solids will settle to the bottom of the tank. Where the top 88 of the feedwell 80 is closed, a vent line 56 may be included to vent gases away from the feedwell 80. In a standard clarifier tank (i.e., one which does not have a clarified liquid storage zone), the walled member 82 is positioned at the top of the tank with the upper perimeter edge 85 positioned at or above the fluid line in the tank, and is open at the top.

Reduction of fluid velocity and dissipation of energy in the feedwell 80 of the present invention may further be enhanced by the addition of an angled rim 94, shown in phantom in FIG. 2, which extends downwardly from the lower perimeter edge 86 of wall 83. The angled rim 94 slopes inwardly toward the central axis 87 of the feedwell 80 to provide a contact surface against which the influent slurry can impact before it exits the feedwell 80 through the opening 96 at the bottom 98 of the feedwell 80. By impacting the angled rim 94, fluid velocity is further reduced, and the formation of any vortex in the fluid may be dissipated.

Reduction of fluid velocity may also be enhanced by the placement of one or more baffles 100, shown in phantom in FIGS. 2 and 3, within the walled member 82 such that as influent slurry enters the feedwell 80, the liquid encounters the baffles 100. The baffles 100 may take any suitable form, and may be positioned at any number of places in the walled member 82. By way of example only, the baffles 100 are shown in FIG. 2 as being positioned at an elevation just below the nozzles 84, 84' and at a midpoint of the walled member 82. The baffles 100 may be positioned at a higher or lower elevation, however. Further, by way of example only, the baffles 100 may extend from near the central axis 87 of the feedwell 80 to a point of attachment 102 to the substantially continuous wall 83 of the walled member 82. The baffles 100 may, for example, be connected to a support ring 104 which is positioned about the drive shaft 38 in a manner which allows the drive shaft 38 to rotate. Alternatively, the baffles 100 may extend from one side of the wall 83 to the other side while avoiding intersection with the drive shaft 38. The baffles 100 may generally provide a contact surface 106 against which the influent feed may contact to dissipate energy, but the configuration of the baffles 100 may vary.

The feedwell 80 may be supported within the tank of a clarifier unit in any suitable way. By way of example, however, the feedwell 80 may be supported in the tank by the connection of upper hanger rods or cables 108 and lower hanger rods or cables 109 to the feedwell 80 which attach, at the other end thereof, to the inside wall of the tank. Although not shown, cables or rods may also be connected to the feedwell 80 to suspend it from a bridge spanning across the tank.

Figure 4:
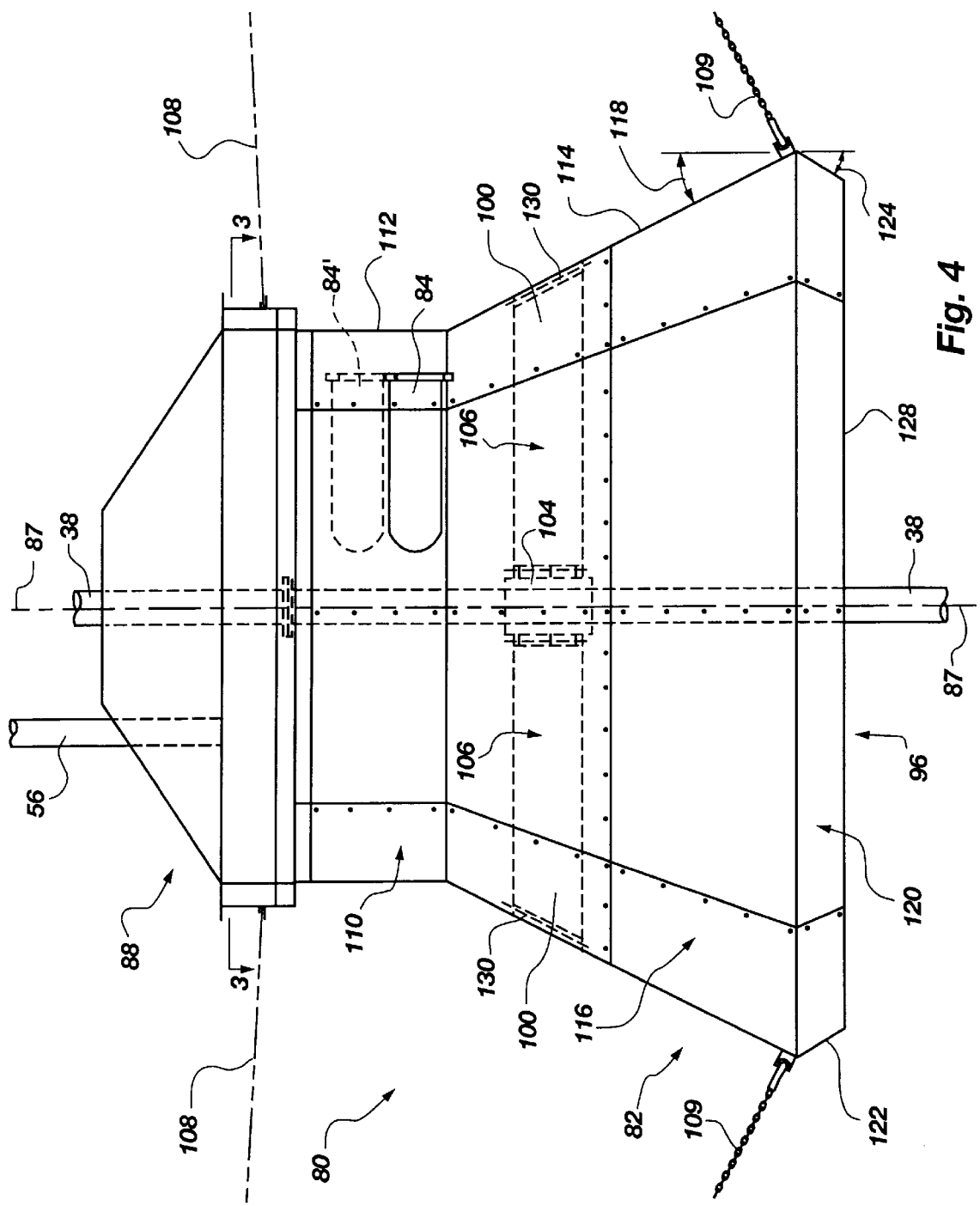
FIG. 4 is a view in elevation of an alternative embodiment of the feedwell of the present invention.

In an alternative embodiment of the invention illustrated in FIG. 4, the feedwell 80 of the present invention may comprise an upper feedwell section 110 into which the influent feed stream is introduced through nozzles 84, 84' which extend through the wall 112 of the upper feedwell section 110. As seen more clearly in FIG. 5, the nozzles 84, 84' may preferably be positioned to deliver influent feed to the upper feedwell section 110 at a tangential angle to the wall 112 of the upper feedwell section 110, and are positioned in opposing orientation to each other along the wall 112. As shown in FIG. 4, the nozzles 84, 84' may be positioned such that one nozzle 84' is higher in elevation than the other nozzle 84. This arrangement of the nozzles 84, 84' facilitates dissipation of energy as the influent feed enters the upper feedwell section 110. Each nozzle 84, 84' is in fluid communication with an influent feed pipe (not shown) of conventional construction.

As previously described, if the feedwell 80 is to be installed in a unit storage clarifier tank 12 of the type shown in FIG. 1, the upper feedwell section 110 is preferably substantially enclosed by a three-dimensional top 88 which is structured to accommodate the passage of a drive shaft 38 therethrough for rotation of a rake assembly. The feedwell 80 may also be structured to accommodate a vent line 56 as previously described. The use of a vent line 56 to vent entrained air from the feedwell 80 is optional and may not be required or desirable in all applications.

The feedwell 80 illustrated in FIG. 4 further includes a lower feedwell section 114, or walled member 82, which is structured to provide a zone of increasing area in which the influent feed may move to further dissipate energy prior to entering into the tank. The lower feedwell section 114 may comprise, for example, a conically-shaped member, the wall 116 of which extends downwardly and outwardly from the wall 112 of the upper feedwell section 110. The shape or geometry of the lower feedwell section 114 may be any other suitable shape or geometry which provides an increasing area within the feedwell 80. The wall 116 of the lower feedwell section 114 may, for example, have an angle 118 of from about 15° to 65° from the vertical, depending on the particular application. The feedwell 80 may also include an angled rim section 120 comprising a wall 122 which extends downwardly and inwardly from the wall 116 of the lower feedwell section 114. The wall 122 of the angled rim section 120 has an angle 124 which may, for example, be from about 1° to about 75° from the vertical. The lower edge 128 of the angled rim section 120 defines the opening 96 through which fluid moves from the feedwell 80 to enter the tank.

Figure 5:
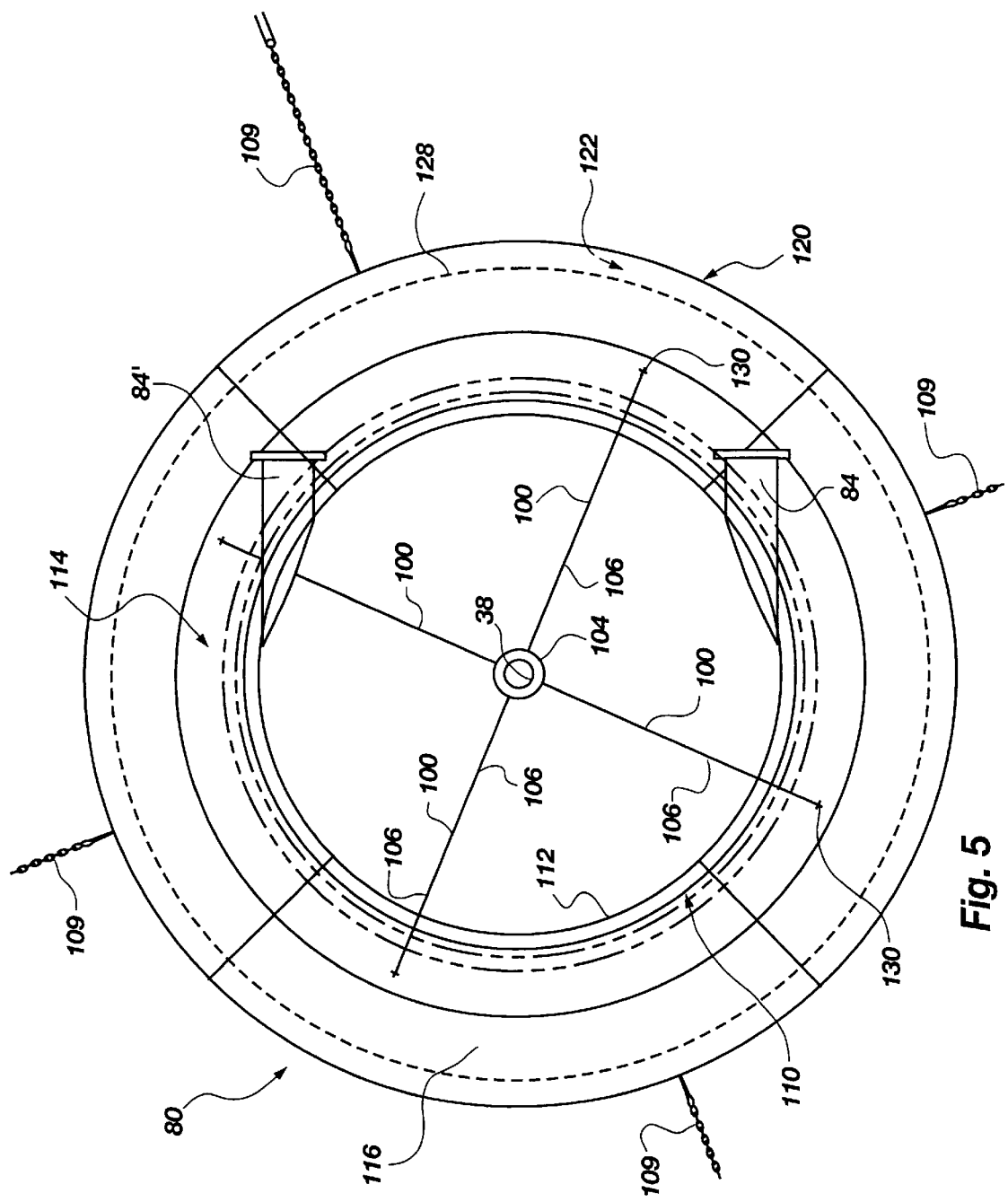
FIG. 5 is a view in lateral cross section of the feedwell shown in FIG. 4, taken at line 3—3, illustrating the use of vertical baffles in the feedwell.

The feedwell 80 may have one or more baffles 100 located in the lower feedwell section 114 in a position below the upper feedwell section 110. Each baffle 100, as shown in FIG. 4, is connected at one end 130 to the wall 116 of the lower feedwell section 114 and is connected at the other end to a support ring 104 which encircles the drive shaft 38, as shown more clearly in FIG. 5. The support ring 104 may be formed in two halves (i.e., split ring) for ease of retrofitting the feedwell 80 about an existing drive shaft 38. The baffles 100 may have any suitable shape, but are shown, by way of example, as elongated planar members having a contact surface 106 against which fluid impacts for dissipation of energy. Four baffles 100 are shown in FIGS. 4 and 5 as being substantially vertically oriented within the lower feedwell section 114. However, the baffles 100, in this or any embodiment of the feedwell 80, need not be strictly vertical in orientation and may, in fact, be positioned at an angle to the vertical. Additionally, the baffles 100 may be oriented about the central axis 87 of the feedwell 80 along a single horizontal plane, as shown in FIG. 2, or the baffles 100 may be positioned at different elevations. Although one grouping of baffles 100 is shown, there may be two or more groupings of baffles 100 positioned at different elevations about the central axis 87 of the feedwell 80.

The feedwell 80 of the present invention may be attached to the surrounding tank in any suitable manner, including the securement of upper hanger rods or cables 108 and lower hanger rods or cables 109 to the feedwell 80. The upper hanger cables 108 and lower hanger cables 109 are in turn attached to the wall of the tank. Additional hanger rods which are not shown may suspend the feedwell 80 from a bridge or other structure spanning the tank.

In operation, influent feed enters from an influent feed pipe (not shown) into the nozzles 84, 84' of the upper feedwell section 110 and is introduced into the upper feedwell section 110 at a tangential angle to the wall 112. Energy dissipation in the fluid begins at that point. As the fluid continues to circulate through the feedwell 80, it enters into the lower feedwell section 114 and the expanding area thereof, which further helps dissipate energy and reduce fluid velocity. In addition, the circulating fluid may contact the baffles 100, when employed, which enhances the energy dissipation process. As the fluid circulates and flows downwardly, the ever expanding area of the lower feedwell section 114 helps to reduce the velocity of the fluid even more. Finally, the circulating fluid contacts the wall 122 of the angled rim section 120 which directs the fluid inwardly toward the central axis 87 of the feedwell 80. The angled wall 122 helps to prevent the formation of a vortex in the fluid and directs the fluid in a direction away from the fluid settling in the clarification zone so that turbulence is reduced.

The feedwell of the present invention is structured to facilitate the dissipation of energy from an influent feed stream prior to entry of the influent feed into a clarification tank, and to enhance the reduction of fluid velocity over conventional feedwell devices. Thus, the feedwell described herein may be used in a clarifier tank for the separation of solids and liquid components from an influent feed in any number of applications. Therefore, reference herein to specific details of the illustrated embodiment is by way of example and not by way of limitation. It will be apparent to those skilled in the art that many modifications of the basic illustrated embodiment may be made without departing from the spirit and scope of the invention as recited by the claims.

What is claimed is:

1. An energy dissipation feedwell for use in a clarifier tank comprising:

a walled member having an upper perimeter edge, a lower perimeter edge and a substantially continuous wall extending from said upper perimeter edge to said lower perimeter edge, said substantially continuous wall being configured to provide an increasing area for fluid circulation from near said upper perimeter edge toward said lower perimeter edge;

a top extending generally over said upper perimeter edge and presenting a raised portion;

at least one influent feed inlet to said walled member adjacent said substantially continuous wall and directing at least two streams of influent feed to each flow generally tangentially around an interior surface of the walled member for flow of influent feed into said walled member under pressure and in generally opposed directions of rotation to reduce the angular velocity of influent feed flowing down through said walled member;

an opening formed at said lower perimeter edge for discharge of influent feed from said walled member; and structures for attaching said walled member to a clarifier tank.

2. The feedwell of claim 1 further comprising an angled rim extending downward and inwardly from said lower perimeter edge of said walled member.

3. The feedwell of claim 1 further comprising at least one baffle connected to said substantially continuous wall and positioned to provide a contact surface for contact of influent feed thereagainst.

4. The feedwell of claim 3 further comprising an angled rim extending downward and inwardly from said lower perimeter edge of said walled member.

5. The feedwell of claim 1 wherein said upper perimeter edge has a smaller dimension than the dimension of said lower perimeter edge such that said substantially continuous wall is angled outwardly and downwardly from said upper perimeter edge to said lower perimeter edge to provide said increasing area for fluid circulation.

6. An energy dissipation feedwell for introducing influent feed into a storage clarifier tank with the feedwell positioned below the top of the tank, the feedwell comprising:

a walled member having a closed top, an open bottom, an upper walled section, a lower walled section and at least one influent feed inlet in said walled member for the flow of at least two streams of the influent feed under pressure into the feedwell;

the top extending over the upper walled section and presenting a raised portion;

the upper walled section presenting a surface of revolution around a central vertical axis at the interior of the upper walled section, with the at least one influent feed inlet directing said at least two streams each to flow generally along tangents to the surface of revolution at spaced locations therearound and directed in generally opposed directions of rotation to reduce the angular velocity of influent feed flowing down through the feedwell;

the lower walled section presenting an outwardly inclined interior surface with the horizontal cross-sectional area of the lower walled section thus increasing from adjacent the upper end of the lower walled section toward its lower end for reducing the downward velocity of the influent feed entering the tank.

7. The feedwell of claim 6 further comprising generally vertical baffles in the feedwell below the at least one influent feed inlet for further reducing angular velocity of the influent feed.

8. The feedwell of claim 6 wherein the lower walled section is of generally frustoconical shape.

9. The feedwell of claim 6 further comprising an inwardly inclined rim at the lower end of the lower walled section.

10. The feedwell of claim 6 wherein the at least two influent feed streams are initially directed to flow at different vertical elevations in the upper walled section, and the upper walled section is free of horizontal baffles preventing the at least two streams of influent feed from impinging each other.

11. The feedwell of claim 6 wherein the upper walled section is generally cylindrical in shape.

12. The feedwell of claim 11 wherein the top is of generally conical shape.

* * * * *

UNITED STATES PATENT AND TRADEMARK OFFICE
CERTIFICATE OF CORRECTION

PATENT NO.   : 5,944,995
DATED        : August 31, 1999
INVENTOR(S)  : Bal K. Sethi, Sherman C. Wu and John P. Crane It is certified that error appears in the above-identified patent and that said Letters Patent is hereby corrected as shown below:

<u>Column 6,</u>
Line 24, change "threedimen-" to -- three-dimen- --

Signed and Sealed this

Fifth Day of August, 2003

JAMES E. ROGAN
*Director of the United States Patent and Trademark Office*